Feb. 14, 1961 H. G. THRASHER 2,971,383
PRECISION IRROTATIONAL MOUNT
Filed June 26, 1959 2 Sheets-Sheet 1

INVENTOR.
Howard G. Thrasher

By Richard K. Ehrlich
Attorney

Feb. 14, 1961  H. G. THRASHER  2,971,383
PRECISION IRROTATIONAL MOUNT
Filed June 26, 1959  2 Sheets-Sheet 2
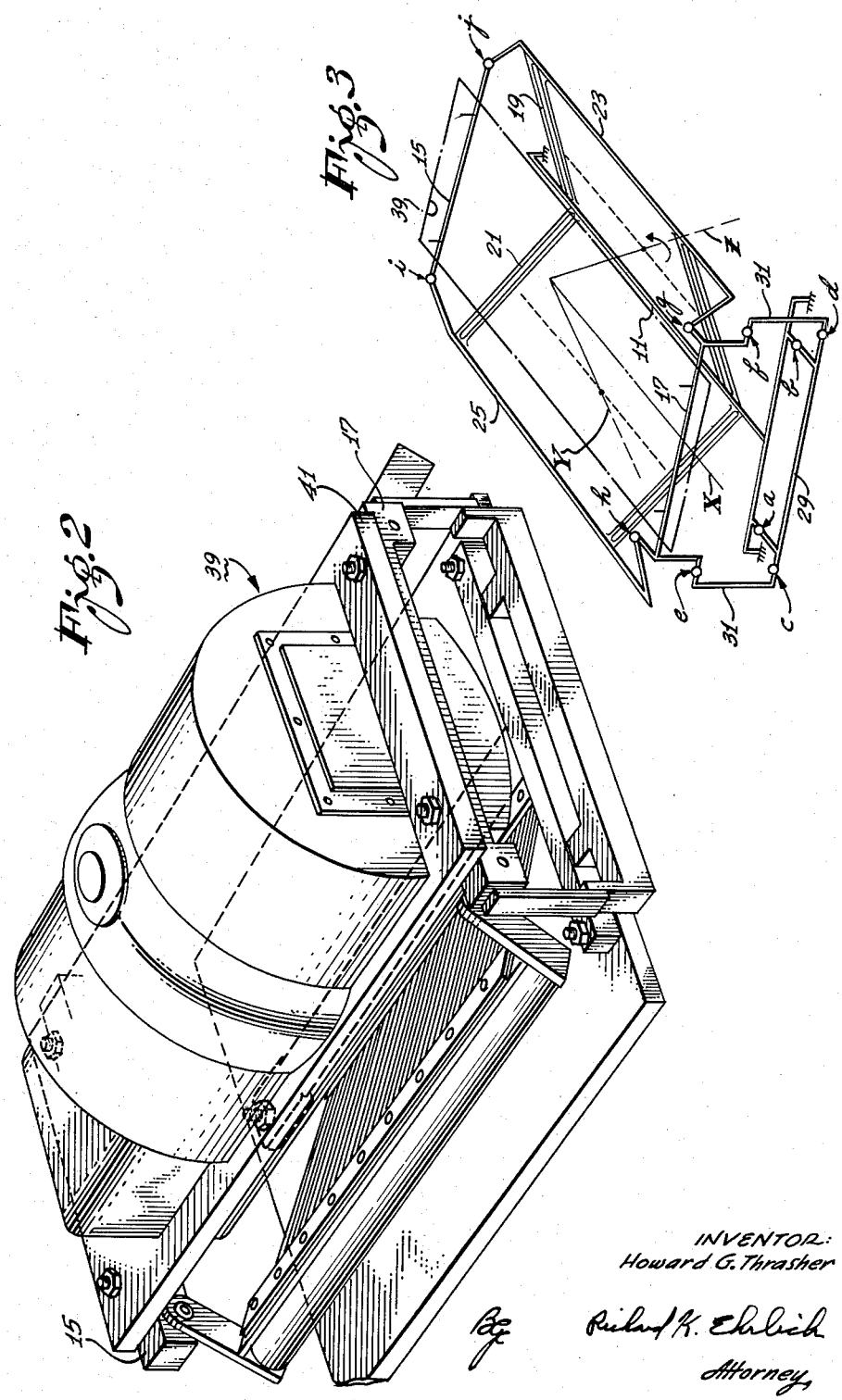
INVENTOR:
Howard G. Thrasher
Richard K. Ehrlich
Attorney

United States Patent Office 2,971,383
Patented Feb. 14, 1961

2,971,383

PRECISION IRROTATIONAL MOUNT

Howard G. Thrasher, Long Beach, Calif., assignor, by mesne assignments, to Litton Systems, Inc., Beverly Hills, Calif., a corporation of Maryland Filed June 26, 1959, Ser. No. 823,163

12 Claims. (Cl. 74—5.0)

The present invention relates to a precision irrotational mount and more particularly to a precision irrotational mount for isolating a platform from vibration and for preserving throughout three dimensions the angular orientation of the platform.

In many systems and devices in current use it is necessary to isolate a platform from vibrations as well as to insure that the platform maintains a constant angular orientation with respect to a predetermined reference. For example, the inertial platform of inertial navigational systems must be mounted within the vehicle whose position is to be determined in such a manner that vibrations of the vehicle are not transmitted to the inertial platform and also in such a manner that the inertial platform experiences no rotational movement with respect to the vehicle or, in other words, the angular orientation of the platform with respect to the vehicle is continually maintained. The importance of the isolating requirements of an inertial platform become clear when it is realized that the gyroscopes and accelerometers mounted on the platform rectify high frequency vibration applied thereto so that a spurious output signal is generated by these components in response to vibration whereby the accuracy of the navigational system is severely limited. Further, it is clear that unless the angular orientation of the platform is maintained inaccurate accelerations will be sensed thereby severely limiting the accuracy of the system.

As would be expected, many different types of mounting devices have been developed in the prior art to overcome the foregoing accuracy limitations. However, the prior art mounting devices are incapable of isolating the platform affixed to the mount and in addition preserving the angular orientation of the platform with respect to the vehicle to which it is mounted. For example, one popular type of mounting device which has been utilized in the prior art includes a pair of U-shaped torsion bars orientated orthogonal to each other with the base portion of the bars pivotably affixed to the base or vehicle and the ends of the legs of the bars pivotably affixed to the platform. As is apparent, the bars preserve the angular orientation of the platform with respect to the vehicle in a predetermined plane. However, the platform is left free to rotate with respect to the vehicle in the predetermined plane thereby limiting the accuracy of the navigational system. Also, the rigid torsion bars permit vibration directed along the predetermined plane to be transmitted to the platform whereby spurious signals are generated by the gyroscopes and accelerometers mounted on the platform.

The present invention on the other hand, provides a compact irrotational mount which overcomes the foregoing and other limitations of the prior art by substantially isolating from vibration a platform mounted thereon and, in addition, by preserving the angular orientation of the platform throughout three dimensions. In accordance with the concepts of the invention the mounted platform is coupled to the vehicle or base by means of three mutually orthogonal flexible quadrilaterals having parallel opposite sides, the quadrilaterals being capable of flexure thereby isolating the platform from base vibration.

In a preferred embodiment of the invention the irrotational mount includes a base coupled to the vehicle or base and a platform carriage for mounting the platform thereon. In accordance with the invention the platform carriage and base plate are connected by means of a pivotably jointed parallelogram which is pivotably coupled to the base plate and carriage platform and by a pair of quadrilateral flexure plates having parallel opposite sides, a predetermined side of each of the flexure plates being oriented substantially perpendicular to the plane of the pivotably joined parallelogram and affixed to the base plate, a side of each flexure plate opposite the predetermined side being pivotably coupled to the platform carriage in such an orientation that the flexure plates are mutually orthogonal.

Further, in accordance with the preferred embodiment of the invention the sides of the pivotably jointed parallelogram are intercoupled by means of four ball joint bearings. In addition, the parallelogram is similarly pivotably coupled to the base plate and to the platform carriage by means of two pairs of ball joint bearings, respectively, while the sides of the flexure plates pivotably coupled to the carriage platform are each pivotably coupled thereto by means of a pair of ball joint bearings. In this regard it should be noted that while the use of the preloaded ball joint bearings as described herein is found to be satisfactory any one of the many differing types of pivotable coupling devices known in the art can be used with the mount of the present invention. Hence, the invention is not to be limited in its scope to ball joint bearing pivots.

It is therefore, an object of the present invention to provide a precision irrotational mount for accurately maintaining the angular position of a platform mounted thereon with respect to the platform base.

It is another object of the present invention to provide an irrotational mount which is capable of substantially isolating a platform mounted thereon from vibrations experienced by the base to which the platform is affixed.

It is a further object of the present invention to provide an irrotational mount which is relatively compact in design and capable of isolating a platform mounted thereon from vibration and for preventing rotation of the platform with respect to a base on which the mount is affixed.

It is still another object of the present invention to provide an irrotational mount including a pivotably jointed parallelogram and a pair of quadrilateral flexure plates having parallel opposite sides which are positioned mutually orthogonal to each other and to the plane of the pivotably jointed parallelogram.

The novel features which are believed to be characteristic of the invention, both as to its organization and method of operation, together with further objects and advantages thereof, will be better understood from the following description considered in connection with the accompanying drawings in which one embodiment of the invention is illustrated by way of example. It is to be expressly understood, however, that the drawings are for the purpose of illustration and description only, and are not intended as a definition of the limits of the invention.

Figure 2 is a three dimensional view of the irrotational mount shown in Figure 1 depicting the manner of mounting a platform thereon.

Figure 3 is an illustrative view of the irrotational mount shown in Figure 1 which is useful in understanding the operation of the irrotational mount of the present invention.

Figure 1:
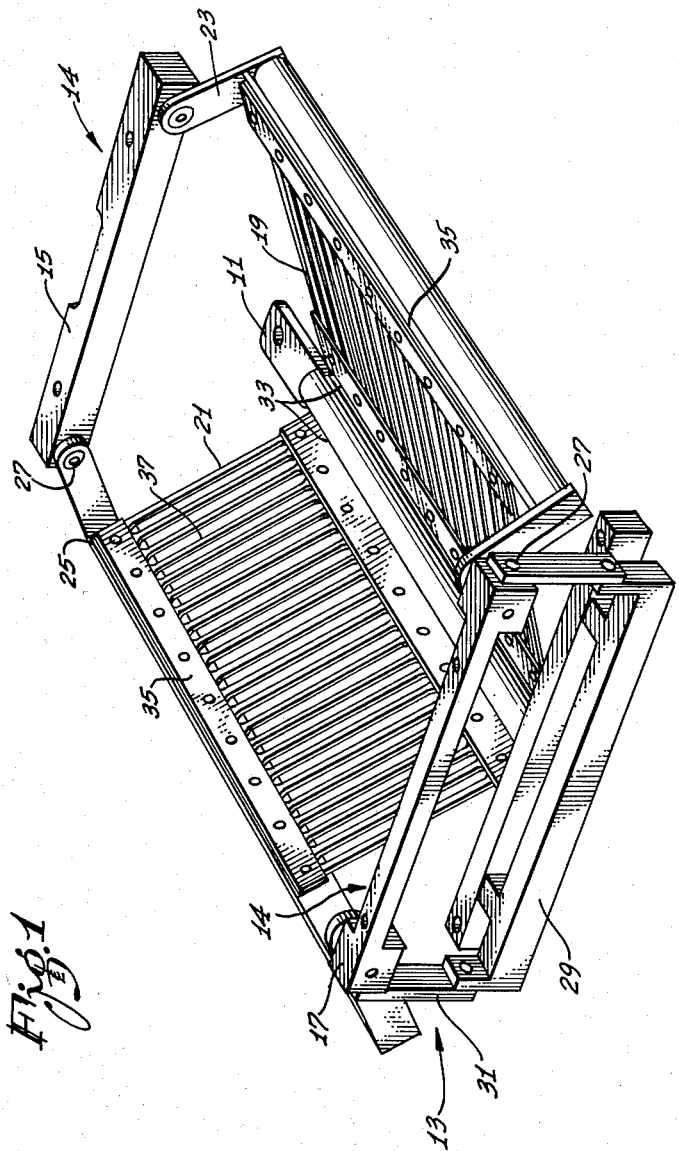
Figure 1 is a three dimensional view of a preferred embodiment of an irrotational mount mechanized in accordance with the teachings of the invention.

Referring now to the drawings wherein like or corresponding parts are designated by the same reference character throughout the several views, there is shown in Figure 1 a three dimensional view of a preferred embodiment of the irrotational mount of the invention. As shown in Figure 1, the irrotational mount includes five basic components, namely: a T-shaped base plate 11 which is affixed to a base, not shown, such as the frame of an airplane; a pivotably jointed parallelogram 13 pivotably coupled to base plate 11; a platform carriage generally designated 14 including a support bar 15 and a support bar 17 which also serves as one side of parallelogram 13; a pair of mutually orthogonal quadrilateral flexure plates 19 and 21 each having a side affixed to base plate 11 and a side opposite thereof pivotably coupled to platform carriage 14; a pair of U-shaped rigid supports 23 and 25 which are utilized to pivotably couple plates 19 and 21, respectively, to platform carriage 14; and a plurality of ball joint bearings 27 which pivotably intercouple the foregoing elements of the irrotational mount.

Considering base plate 11 in more detail the base plate should be constructed from a reasonably strong, lightweight, non-flexible material. In this connection it should be noted that while a number of materials are available which are suitable for use in the mechanization of the base plate 11 a weldable aluminum alloy such as 60–61 T6, for example, functions satisfactorily and simplifies the fabrication of the mount of the invention.

As shown in Figure 1, three apertures are provided at each of the three ends, respectively, of base plate 11 which allow a bolt to pass therethrough for rigidly affixing the base plate to the base upon which the platform is to be mounted. As further indicated in Figure 1, the bar of the base plate 11 has two apertures therein which as will be hereinafter explained are utilized in conjunction with two ball joint bearings 27 for pivotably mounting parallelogram 13 to the base plate.

As shown in Figure 1, parallelogram 13 includes side 17 which also forms part of platform carriage 14 and a side 29 positioned opposite side 17 and which is coupled to the bar of the base plate. In addition, the parallelogram includes a pair of sides 31, sides 31 being connected to sides 17 and 29 by means of four ball joint bearings 27, sufficient space being left between sides 31 and sides 17 and 29 at the points of coupling so that the sides of the parallelogram are jointed in such a fashion that the joints are pivotable or rotatable in all directions. In this regard, it should be noted that the parallelogram can be distorted in a plane that has all four sides of the parallelogram therein to vary the distance between sides 17 and 29, the plane being hereinafter referred to as the plane of the parallelogram. Since it is clear that parallelogram 13 can not be distorted from its basic parallelogram configuration sides 17 and 29 remain parallel regardless of distortion.

As indicated in Figure 1, side 29 has a pair of extensions thereon which are in registry with the foregoing described apertures in the bar of the T-shaped base plate, the extensions being affixed within the apertures by a pair of ball joints 27 whereby parallelogram 13 is pivotably coupled to the base plate. As further shown in Figure 1, a pair of apertures are provided in either side of side 17 which are used to affix to the sides the ball joint bearings which pivotably couple torsion supports 23 and 25.

Referring to the ball joint bearings discussed hereinabove in connection with parallelogram 13 and those to be hereinafter discussed in connection with the intercoupling of the remaining structure of the irrotational mount, any one of the numerous types of ball joint bearings known in the art can be used with success in mechanizing the invention. However, a preferred type of structure suitable for use with the present invention is disclosed in co-pending U.S. patent application Serial No. 775,978, for "Ball Joint Bearing," filed November 24, 1958, by Howard G. Thrasher and Delmer L. Enge. Further, while ball joint bearings have been found to be suitable for pivotably intercoupling the members of the apparatus of the present invention other pivotable coupling devices known in the art can also be used so that the invention is not to be limited to the use of ball joint bearings.

Continuing with the description of the present invention it is apparent from an examination of Figure 1 that each quadrilateral flexure plate 19 and 21 includes a pair of opposite sides 33 and 35 and a plurality of flexure spokes 37 interconnecting sides 33 and 35. As is further shown in Figure 1, that sides 33 are affixed to the center bar of T-shaped base plate 11 in such a manner that they are perpendicular with the plane of parallelogram 13 and so that the flexure plates are mutually orthogonal. It should be noted that if the flexure plates are mechanized from a weldable light material such as aluminum alloy 7075–T6 sides 33 can be easily affixed to the center of the base plate by a simple welding operation. However, it is clear that sides 33 can be affixed to the base plate in any number of ways.

Continuing further with the description of the invention, side 35 is affixed to the base portion of U-shaped support 23 as, for example, by welding or riveting while side 35 of plate 21 is affixed in a similar manner to support 25. As is apparent from Figure 1, one of the legs of each of supports 23 and 25 is pivotably connected to bar 17 while the other leg of each support is connected to bar 15.

Referring again to the quadrilateral flexure plates, it is evident that the flexure plates can be distorted by applying a force thereto. More specifically, the flexure plates can be distorted since spokes 37 can be bent or flexed. However, it should be noted that while spokes 37 are flexible they are not under normal conditions of operation expandable or contractable so that sides 33 and 35 are maintained parallel even when the plates are distorted. Hence, the flexure plates always define a parallelogram even though the distance between sides 33 and 35 can be reduced or expanded by the proper application of forces to the plates. As will be hereinafter described in detail distortion or flexure of the plates will ultimately result in the lowering or raising of the carriage platform and hence the platform itself.

In regard to the platform and the manner in which it is mounted to the platform carriage attention is directed to Figure 2 wherein there is shown a platform mounted to a base by means of the irrotational mount shown in Figure 1. As shown in Figure 2, a gyro platform 39 including a rigid platform plate 41 is bolted to platform carriage 14 by means of bolts which pass through bars 15 and 17. Platform 39 can be of the type disclosed in co-pending U.S. patent application Serial No. 568,949, for "Low Drift Gyro Stabilized Platform," filed on February 29, 1956, by Henry E. Singleton and Harold F. Erdley. It should be noted that the rigid plate 41 of the platform 39 insures that bar 15 is unable to rotate about its longitudinal axis because of a possible looseness of the ball joint bearings and also insures that bar 15 is unable to rotate about an axis perpendicular with the plane of parallelogram 13 since bar 15 is rigidly coupled to bar 17 of parallelogram 13.

As further shown in Figure 2, base plate 11 is securely fastened to the base upon which platform 39 is mounted by means of three bolts passing through the apertures at the three ends, respectively, of base plate 11. As hereinbefore noted when platform 39 is so mounted the platform is isolated from any vibration experienced by the base through the flexibility of quadrilateral flexure plates 19 and 21 and is maintained in a predetermined orientation with respect to the base by means of the unique operation of the mount due to the cooperative action of the flexure plates and parallelogram 13.

Referring now to the cooperative action of the flexure plates and parallelogram 13 attention is directed to Figure 3 wherein there is shown an illustrative view of the irrotational mount of Figures 1 and 2 with an X—Y—Z coordinate system which is fixed in space with respect to the base superimposed thereon. As is apparent from Figure 3, the coordinate system is so oriented that X, Y, and Z axes are orthogonal to the plane of parallelogram 13, the surface of flexure plate 21, and the surface of flexure plate 19, respectively, as they are positioned when the platform is in its null or undistorted position. As further shown in Figure 3, the pivotable connections of the irrotational mount are designated by alphabetic characters $a$ through $j$, respectively, while platform 39 is designated by a broken line rectangle.

In order to facilitate the understanding of the manner in which the irrotational mount of the invention functions to preserve the angular orientation of platform 39 with respect to the base assume that a torque is applied to platform carriage 14 which tends to rotate the platform carriage about the X axis. It is clear, of course, that resultant torques tending to rotate the platform carriage in this direction as well as in other directions are generated when base 11 experiences acceleration since the center of mass of the platform carriage is positioned above base 11 and the platform carriage is not rigidly coupled to the base, it being clear, of course, that it is impossible to both isolate the platform carriage from vibration and rigidly couple the platform carriage to base 11.

Considering now the effect of the torque tending to produce rotation about an X axis it is clear that the torque tends to raise one of the supports 23 or 25 with respect to the other and thus tends to rotate bars 15 and 17. However, as hereinbefore described bar 17 forms one side of the pivotably jointed parallelogram 13 so that it is physically impossible for bar 15 to rotate from the parallel position with its opposite side 27 and hence with the bar of the T-shaped base plate 11. Further, since bar 15 is connected to bar 17 by the two rigid supports 23 and 25 and also by rigid platform plate 41 bar 15 cannot rotate with respect to bar 17 so that the entire platform carriage as well as platform 39 mounted thereon will be constrained from rotation.

Examining in more detail the operation of the mount in response to application of the torquing force tending to produce rotation about the X axis, one of the supports 23 or 25 tends to be raised with respect to the other. For example, assuming that the torque is directed counterclockwise with respect to Figure 3 support 23 will tend to be raised and support 25 will tend to be lowered by rotation about pivots $g$, $j$, and $h$, $i$, respectively. However, since as heretofore discussed side 17 is held parallel to side 29, side 17 does not rotate about the X axis but undergoes translational movement with respect to side 29 whereby the distance between sides 17 and 29 is reduced, spokes 37 compensating for the reduction in distance between the two sides and the translation motion by flexing. Hence, the platform is capable of accepting accelerations tending to produce rotation about the X axis without rotating.

Examining now the operation of the mount in response to a torque tending to rotate the platform carriage about the Z axis. As indicated in Figure 3, for such a rotation to occur side 35 of plate 19 must become orientated in a non-parallel manner with respect to side 33 of the plate since side 33 is rigidly attached to base 11. This orientation can only be accomplished by the compression of some of spokes 37 and the expansion of others but, as has been hereinbefore explained, spokes 37 are not subject to expansion and contraction so that bars 17 and 15 are constrained from the rotational movement. It is apparent that the functioning of the mount in response to the application of a torque directed opposite to the direction of the arrow shown in Figure 3 is similar to that described herein in connection with the torque oriented as shown by the arrow.

Continuing further with the discussion of the operation of the invention it is clear from Figure 3 that the platform is constrained by its internal operation from rotating about the Y axis in the same manner as was described in connection with possible rotation about the Z axis except that plate 21 is involved instead of plate 19. Hence, it is clear that the irrotational mount of the present invention is capable of preserving the angular orientation of the platform carriage with respect to the base plate about three mutually orthogonal rotation axes so that the orientation of the platform with respect to the base is preserved.

Examining now the isolating operation of the irrotational mount of the invention, it is evident from Figure 3 that if vibration directed along the X axis of Figure 3 is applied to base plate 11 from the base to which the base plate is affixed base plate 11 will experience vibratory motion with respect to the platform carriage. This is the case since the base plate is free to move along the X axis due to the freedom of movement allowed by bearings $a$, $b$, $c$, $d$, $e$, and $f$. It is clear, of course, that as base plate 11 moves back and forth along the X axis the individual spokes 37 of plates 19 and 21 are flexed forth and back thereby filtering out most of the vibration so that vibration is not transmitted to the platform carriage.

Examining now the operation of the irrotational mount in regard to the application of vibration directed along the Z axis, as shown in Figure 3, it is again clear that base plate 11 is free to move back and forth along the Z axis with respect to the platform carriage because of the freedom of movement permitted by pivots $i$, $j$, $h$, $g$, $e$, and $f$. It is also apparent that again spokes 37 are flexed back and forth in order to accommodate for the relative motion of the base plate with respect to the rest of the mount whereby the platform carriage is substantially isolated from vibration oriented along the Z axis.

In regard to vibration of base plate 11 along the Y axis, the operation of the irrotational mount to accomplish isolation is identical with the operation of the mount to accomplish isolation with respect to vibration oriented along the Z axis except the plate 21 is utilized instead of plate 19. Hence it is clear from the foregoing discussion and the fact that any vibration regardless of its orientation can be resolved about three mutually orthogonal axes that the platform carriage is substantially isolated from vibration no matter what its orientation.

It is to be expressly understood, of course, that numerous modifications and alterations may be made in the irrotational mount herein disclosed without departing from the basic concept of the invention. For example, it will be recognized that the flexible quadrilateral plates need not be spoked but can be mechanized in numerous different manners which provide the necessary flexibility. In fact, it is clear that flexible plates need not be used but that any apparatus providing the necessary flexure can be used. Accordingly, it is to be expressly understood that the scope of the invention is to be limited only by the spirit and scope of the appended claims.

What is claimed as new is:

1. An irrotational mount for isolating a platform from vibration experienced by a base to which it is mounted, said mount comprising: a base plate adapted to be coupled to the base; a platform carriage for mounting the platform thereon; first means coupling said base plate to said platform carriage for restraining rotational movement of said platform with respect to said base plate about a first predetermined axis; second means coupling said base plate to said platform carriage for restraining rotation of said platform with respect to said base plate about second and third axes substantially orthogonal with respect to each other and said first axis and for isolating the platform from vibrations experienced by said base plate whereby the angular relationship of the platform with respect to the base is preserved.

2. The combination defined in claim 1 wherein said second means includes a first flexure quadrilateral having substantially parallel opposite sides, a predetermined side being oriented along a line substantially parallel with said first axis and coupled to said base plate, the side opposite said predetermined side being coupled to said platform carriage.

3. The combination defined in claim 2 wherein said second means further includes a second flexure quadrilateral oriented substantially orthogonal to said first quadrilateral and having substantially parallel opposite sides, a predetermined side being oriented along a line substantially parallel with said first axis and coupled to said base plate, the side opposite said predetermined side being coupled to said platform carriage.

4. The combination defined in claim 3 which further includes coupling means for pivotably coupling said first and second flexure plates to said platform carriage.

5. The combination defined in claim 4 wherein said first means includes a pivotably jointed parallelogram shaped element.

6. An irrotational mount for isolating a platform from vibration experienced by a base to which it is mounted, said irrotational mount comprising: a base plate adapted to be coupled to the base; a platform carriage for mounting the platform thereon; first means coupling said base plate to said platform carriage for preventing rotational movement of said platform carriage with respect to said base plate about a predetermined axis; and second means coupling said base plate to said platform carriage for isolating said platform and for preventing rotation of said platform with respect to said base plate about second and third axes orthogonal to each other and to said predetermined axis whereby the angular orientation of the platform with respect to the base is preserved.

7. An irrotational mount for mounting a platform upon an associated base to isolate the platform from translational vibrations experienced by the base while preserving the angular relationship of the platform with respect to the base, said mount comprising: a base plate adapted to be coupled to the base; a rigid platform carriage; means forming a pivotably jointed parallelogram structure coupling said platform carriage to said base plate for preventing rotation of said platform carriage about a first axis, said first axis being substantially orthogonal to the plane of said parallelogram; first and second flexible quadrilateral structures having parallel opposite sides, said quadrilateral structures being oriented at substantially right angles with respect to each other, each quadrilateral structure having a predetermined side affixed to said base plate substantially parallel with said first axis and the side opposite the predetermined side of each of said quadrilateral structures being pivotably coupled to said platform carriage, said quadrilaterals being flexible in response to translational vibration along said first axis and being responsive to translational vibrations in a plane orthogonal to said first axis to flexibly arch whereby said carriage is isolated from all translational vibrations, said first and second quadrilateral structures respectively presenting rigid structural elements to rotation of said platform about second and third axes orthogonal to said first axis and normal to said first and second quadrilateral structures.

8. An irrotational mount for isolating a platform from vibration experienced by a base to which it is mounted, said mount comprising: a base plate adapted to be coupled to the base; a platform carriage for mounting the platform thereon; a pivotably jointed parallelogram pivotably coupled to said platform carriage and said base plate for preventing rotation of said platform carriage about a first axis; first and second quadrilateral flexure plates having parallel opposite sides, said plates being substantially mutually orthogonal and each plate having a predetermined side coupled to said base plate substantially parallel with said first axis, the sides opposite said predetermined sides being pivotably coupled to said platform carriage to prevent rotation of said platform carriage about second and third axes orthogonally positioned with respect to each other and said first axis whereby the angular orientation of said platform carriage with respect to said base plate is preserved.

9. The combination defined in claim 8 which further includes coupling means for pivotably coupling said parallelogram to said platform carriage and said base plate and for pivotably coupling said flexure quadrilaterals to said platform carriage, said coupling means including ball joint bearings.

10. The combination defined in claim 8 wherein each of said quadrilaterals further includes a plurality of spokes connecting the predetermined side of said plate with the side opposite the predetermined side.

11. An irrotational mount for isolating the platform from vibration experienced by a base to which the platform is attached, said mount comprising: a base plate adapted to be coupled to the base; a platform carriage adapted for mounting the platform thereon; first and second flexure quadrilaterals having parallel opposite sides, the surfaces of said first and second quadrilaterals being substantially mutually orthogonal and each quadrilateral having a predetermined side affixed to said base plate in such a manner that the predetermined sides of the quadrilaterals are substantially mutually parallel; coupling means for pivotably coupling the sides of said quadrilaterals opposite the predetermined sides to said platform carriage; a pivotably jointed parallelogram coupling said platform carriage to said base plate for preventing rotation of said platform carriage about a first axis substantially perpendicular to the plane of said parallelogram, said parallelogram having a predetermined orientation for positioning said first axis substantially parallel with the predetermined sides of said quadrilaterals and substantially equidistant between the surfaces of said quadrilaterals whereby the angular orientation of said platform carriage with respect to said base plate is maintained.

12. An irrotational mount for isolating a platform from vibration experienced by a vehicle to which the platform is attached, said mount comprising: a base plate adapted to be coupled to the vehicle; a platform including a gyroscope thereon; a platform carriage having said platform mounted thereon; a pivotably jointed parallelogram coupling said platform carriage to said base plate for preventing rotation of said platform carriage about a first axis, said first axis being substantially perpendicular to the plane of said parallelogram; first and second flexure quadrilaterals having parallel opposite sides and each of said quadrilaterals having flexure surfaces bounded by the side of the quadrilateral, the surfaces of said first and second quadrilaterals being substantially orthogonal and said quadrilaterals having a predetermined side affixed to said base plate substantially parallel with said first axis; coupling means for pivotably coupling the side opposite the predetermined side of each quadrilateral to said platform carriage whereby each quadrilateral is operable for preventing rotation of said platform carriage with respect to said base plate about an axis orthogonal to the surface of each quadrilateral to prevent rotation of said platform with respect to said base plate.

References Cited in the file of this patent

UNITED STATES PATENTS

| | | |
|---|---|---|
| 2,457,340 | Berry | Dec. 28, 1948 |
| 2,793,028 | Wheeler | May 21, 1957 |
| 2,797,580 | Taylor | July 2, 1957 |